(12) United States Patent
Kim

(10) Patent No.: US 9,991,038 B2
(45) Date of Patent: Jun. 5, 2018

(54) WAVEFORM SIGNAL OUTPUT DEVICE AND METHOD FOR DRIVING SOLENOID VALVE

(71) Applicant: HYUNDAI AUTRON CO., LTD., Seongnam-si (KR)

(72) Inventor: Yong-Hyeon Kim, Suwon-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 433 days.

(21) Appl. No.: 14/934,365

(22) Filed: Nov. 6, 2015

(65) Prior Publication Data

US 2016/0133370 A1 May 12, 2016

(30) Foreign Application Priority Data

Nov. 6, 2014 (KR) .......................... 10-2014-0153635

(51) Int. Cl.
*B60R 16/02* (2006.01)
*H01F 7/06* (2006.01)
*F16K 31/06* (2006.01)

(52) U.S. Cl.
CPC ......... *H01F 7/064* (2013.01); *F16K 31/0675* (2013.01)

(58) Field of Classification Search
USPC ......................................................... 361/160
See application file for complete search history.

(56) References Cited

U.S. PATENT DOCUMENTS

| 5,452,169 A * | 9/1995 | Joh ........................ G11B 15/61 360/130.24 |
| 6,487,246 B1 | 11/2002 | Hoeld |
| 2016/0133370 A1* | 5/2016 | Kim ........................ H01F 7/064 361/160 |

FOREIGN PATENT DOCUMENTS

| CN | 1898866 A | 1/2007 |
| DE | 103 20 284 A1 | 12/2004 |
| DE | 10 2005 001 425 A1 | 7/2006 |
| DE | 10 2011 051 570 A1 | 1/2012 |
| JP | 2011-066177 A | 3/2011 |
| KR | 10-2010-0132284 A | 12/2010 |
| KR | 10-2013-0084172 A | 7/2013 |

OTHER PUBLICATIONS

German Patent Office, Office Action for German patent application No. 10 2015 119 009.5, dated Oct. 19, 2016, Germany.
Korean Intellectual Property Office, Notice of Allowance for Korean patent application No. 10-2014-0153635, dated Apr. 27, 2016, Korea.

* cited by examiner

*Primary Examiner* — Ronald W Leja
(74) *Attorney, Agent, or Firm* — Baker McKenzie; Hyunho Park

(57) ABSTRACT

The waveform signal output device includes: a signal output unit that reads waveform data recorded in a memory and outputs a waveform signal for driving the solenoid valve according to a waveform renewal signal; a waveform generation unit that generates waveform data for driving the solenoid valve using vehicle driving information and requests renewal of a waveform by outputting the waveform data; a waveform distortion determination unit that compares a time point when the renewal of a waveform is requested and a preset communication prohibition section and determines a possibility of distortion of the waveform signal; and a driving command unit that renews waveform data of the memory using the waveform data generated by the waveform generation unit and outputs a waveform renewal signal if it is determined that there is no possibility of distortion.

10 Claims, 4 Drawing Sheets

WAVEFORM SIGNAL OUTPUT DEVICE AND METHOD FOR DRIVING SOLENOID VALVE

CROSS REFERENCE TO RELATED APPLICATION

This application claims the benefit of Korean Patent Application No. 10-2014-0153635, filed on Nov. 6, 2014, entitled "WAVEFORM SIGNAL OUTPUT DEVICE AND METHOD FOR DRIVING SOLENOID VALVE", which is hereby incorporated by reference in its entirety into this application

BACKGROUND

Technical Field

The present invention relates to a waveform signal output device and a waveform signal signal output method for driving a solenoid valve, and more particularly to a device and a method for outputting a signal that drives a solenoid valve used in a drive unit of a vehicle.

Description of the Related Art

In general, vehicles and machines used in various industrial fields are driven by controlling a solenoid valve. A control unit of the vehicles and machines outputs a waveform signal, and the solenoid valve is driven depending on the output waveform signal. That is, an injector, a high pressure pump valve, an automatic transmission hydraulic valve, and the like of the vehicles are controlled through the solenoid valves, and the control unit includes an MCU that performs various calculation and a solenoid valve driving IC that generates a waveform signal using the calculation result.

FIG. 1 is a diagram of a waveform signal output device for driving a solenoid valve according to the related art. Referring to FIG. 1, vehicle driving information on a crank shaft, a cam shaft, gears, a fuel rail hydraulic pressure, and the like is input to an MCU 102, and the MCU 102 calculates and processes the vehicle driving information and outputs a driving command signal for driving a solenoid valve.

A solenoid valve driving IC 104 reads waveform data from a memory according to the driving command signal and outputs a waveform signal for driving the solenoid valve.

Here, the driving command signal may include waveform data for generating a waveform signal and a waveform signal renewing request for renewing the waveform signal using the waveform data. In this way, the solenoid valve driving IC 104 may read waveform data from a memory (not illustrated) and generate a waveform signal as the renewal of the waveform is requested, and may output the generated waveform signal.

FIG. 2 is a view for explaining a distortion phenomenon of a waveform signal according a waveform signal output device of the related art. Referring to FIG. 2, the MCU 102 transmits a driving command signal to the solenoid valve driving IC 104 according to various driving modes. As described above, the driving command signal may include a waveform renewal request and waveform data.

Meanwhile, the solenoid valve driving IC 104 reads waveform data Data1 from the memory and outputs a waveform signal, and as illustrated in FIG. 2, a time period 206 spent to read waveform data from the memory 106 by the solenoid valve driving IC 104 is delayed in a section from a time point 202 when the solenoid valve driving IC 104 starts to read waveform data from the memory 106 to a time point 204 when a waveform signal is output from the solenoid valve driving IC 104.

Accordingly, when the MCU 102 transmits a driving command signal that commands waveform data Data2 to be changed together with a waveform renewal request, the waveform data Data1 of the memory 106 may be changed to the waveform data Data2 while the memory 106 reads the waveform data Data1. In this case, distortion occurs in a waveform signal 213 output form the solenoid valve driving IC 104, and the waveform distortion phenomenon causes a significant control defect.

BRIEF SUMMARY

Therefore, the present invention provides a waveform signal output device that can determine whether a waveform signal is distorted and changes waveform data only if the waveform signal is not distorted when the waveform signal is renewed to drive a solenoid valve, thereby preventing a distortion phenomenon of the waveform signal while satisfying an existing renewal period of the waveform signal.

The objects of the present invention are not limited to the above-mentioned ones, and the other unmentioned objects and advantages of the present invention will be understood by the following description, and will be understood clearly by the embodiments of the present invention. Further, it is noted that the objects and advantages of the present invention will be implemented through the means described in the claims and a combination thereof.

In accordance with an aspect of the present invention, there is provided a waveform signal output device for driving a solenoid valve, the waveform signal output device including: a signal output unit that reads waveform data recorded in a memory and outputs a waveform signal for driving the solenoid valve according to a waveform renewal signal; a waveform generation unit that generates waveform data for driving the solenoid valve using vehicle driving information and requests renewal of a waveform by outputting the waveform data; a waveform distortion determination unit that compares a time point when the renewal of a waveform is requested and a preset communication prohibition section and determines a possibility of distortion of the waveform signal; and a driving command unit that renews waveform data of the memory using the waveform data generated by the waveform generation unit and outputs a waveform renewal signal if it is determined that there is no possibility of distortion.

As mentioned above, the present invention can determine whether a waveform signal is distorted and changes waveform data only if the waveform signal is not distorted when the waveform signal is renewed to drive a solenoid valve, thereby preventing a distortion phenomenon of the waveform signal while satisfying an existing renewal period of the waveform signal.

BRIEF DESCRIPTION OF THE DRAWINGS

The above and other aspects, features, and advantages of the invention will become apparent from the detailed description of the following embodiments in conjunction with the accompanying drawings, in which.

DETAILED DESCRIPTION

Figure 1:
FIG. 1 is a diagram of a waveform signal output device for driving a solenoid valve according to the related art.

The above-mentioned objects, features, and advantages will be described in detail with reference to the accompanying drawings, and accordingly, the technical spirit of the present invention may be easily carried out by those skilled in the art to which the present invention pertains. A detailed description of known technologies related to the present invention will be omitted to avoid making the technical essence of the present invention rather unclear. Hereinafter, exemplary embodiments of the present invention will be described in detail with reference to the accompanying drawings. In the drawings, the same or like reference numerals denote the same or like elements.

Figure 3:
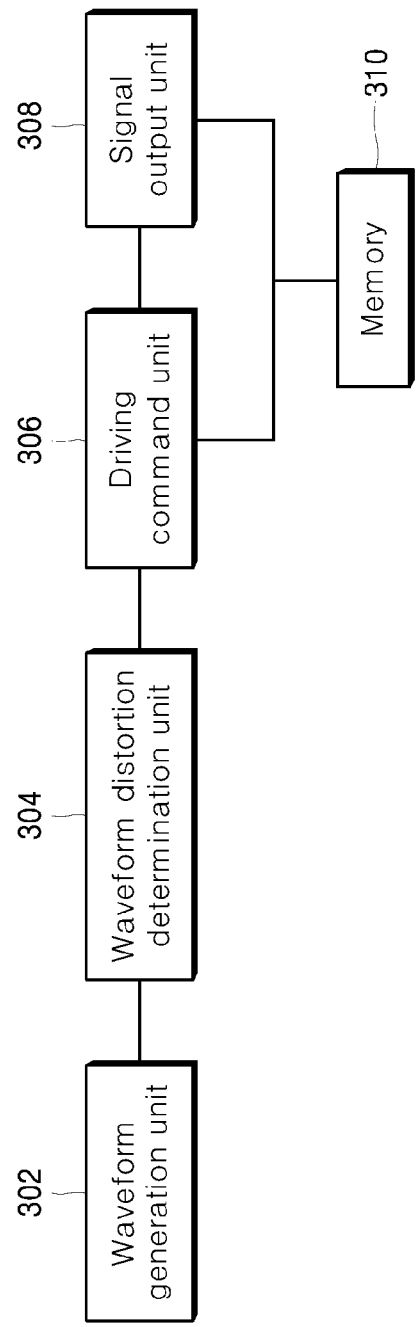
FIG. 3 is a diagram of a waveform signal output device for driving a solenoid valve according to an embodiment of the present invention.

FIG. 3 is a diagram of a waveform signal output device for driving a solenoid valve according to an embodiment of the present invention. Referring to FIG. 3, the waveform output device for driving a solenoid valve according to the present invention includes a waveform generation unit 302 that generates waveform data for driving the solenoid valve using vehicle driving information and requests renewal of a waveform, a waveform distortion determination unit 304 that determines a possibility of distortion of a waveform, a driving command unit 306 that outputs a driving command signal if there is no possibility of distortion of a waveform signal, and a signal output unit 308 that outputs a waveform signal according to the driving command signal. The waveform data for outputting a waveform signal may be recorded in the memory 310.

The signal output unit 308 functions to read waveform data recorded in a memory 310 and to output a waveform signal for driving the solenoid valve according to the driving command signal. Here, the driving command signal may include waveform data and a waveform renewal request. If renewal of a waveform is requested through the driving command signal, the signal output unit 308 may read the waveform data recorded in the memory 310 and output the read waveform data as a waveform signal.

The waveform generation unit 302 may determine a driving mode of the solenoid valve using the vehicle driving information. Here, the vehicle driving information may be information for controlling a crank shaft and a cam shaft of the vehicle, gear information, fuel rail hydraulic information, and the like. If a driving mode is determined, a renewal period of the waveform signal corresponding to the corresponding driving mode for driving the solenoid valve may be determined and the waveform data may be generated. That is, the waveform generation unit 302 may generate waveform data for driving the solenoid valve using the vehicle driving information and request renewal of a waveform according to a renewal period of a waveform signal.

A waveform distortion determination unit 304 functions to compare a time point when the renewal of a waveform is requested and a preset communication prohibition section and to determine a possibility of distortion of the waveform signal.

In an embodiment of the present invention, a driving mode for driving the solenoid valve may be changed while the signal output unit 308 reads waveform data from the memory 310 to output a waveform signal. In this case, if the waveform data recorded in the memory 310 is replaced as the driving mode is changed, distortion occurs in the waveform signal output through the signal output unit 308. a time period delayed by a time period spent to read waveform data from the memory 310 by the signal output unit 308 from a time point when the renewal of a waveform is requested may be set as a communication prohibition section. Furthermore, it is preferable that the communication prohibition section be set to be longer than a time period spent to read waveform data form the memory 310.

In another embodiment of the present invention, a waveform signal may include two or more frames frame1 and frame2. Here, the driving command signal may include a pair of waveform data for frames. That is, the driving command signal may include a pair Data1 and Data3 of waveform data Data1 forming a first frame frame1 and waveform data Data3 forming a second frame frame2.

In the embodiment, the signal output unit 308 may sequentially read a pair Data1 and Data3 of waveform data form the memory 310 to output a waveform signal including two frames. However, after waveform data 1 Data1 forming the first frame frame1 is loaded and before waveform data 2 Data3 is loaded, a driving command signal for changing the pair of waveform data may be input. Accordingly, a waveform signal in which the first frame frame1 is formed by waveform data 1 Data1 and the second frame frame2 is formed by waveform data 2 Data4.

That is, when waveform data of some frames of one or more frames forming a waveform when a waveform signal is renewed according to a driving command signal are replaced by other waveform data, distortion of a waveform signal occurs. In this case, a section to a time point when all of waveform data for outputting a waveform signal may be set as a communication prohibition section for prohibiting renewal of a waveform.

The driving command unit 306 may output a driving command signal for commanding a waveform signal to be output if it is determined by the waveform distortion determination unit 304 that there is no possibility of distortion of a waveform signal. The driving command signal may include a command signal for renewing the waveform data generated by the waveform generation unit 302 and recording the renewed waveform data in the memory 310 and a command signal for renewing a waveform.

The signal output unit 308 may read the renewed waveform data from the memory 310 according to the driving command signal received from the driving command unit 306 and then renew the waveform signal.

In another embodiment of the present invention, if the waveform distortion determination unit 304 determines that distortion of the waveform occurs, a time point when renewal of a waveform is searched for without renewing the waveform data of the memory 310. To achieve this, a search signal having a predetermined communication period may be used. The driving command unit 306 may searches for a time point when renewal of a waveform is allowed using a search signal that communicates with the waveform distortion determination unit 304 at a predetermined period and renew the waveform at a time point when the renewal of the waveform is allowed. That is, the driving command unit 306 may renew the waveform data of the memory 310 using the waveform data generated by the waveform generation unit 302 at the time point when the renewal of the waveform is allowed. Here, it is preferable that the period of the search signal be set to be shorter than a period in which the renewal of the waveform is requested, that is, the waveform renewal period.

Figure 4:
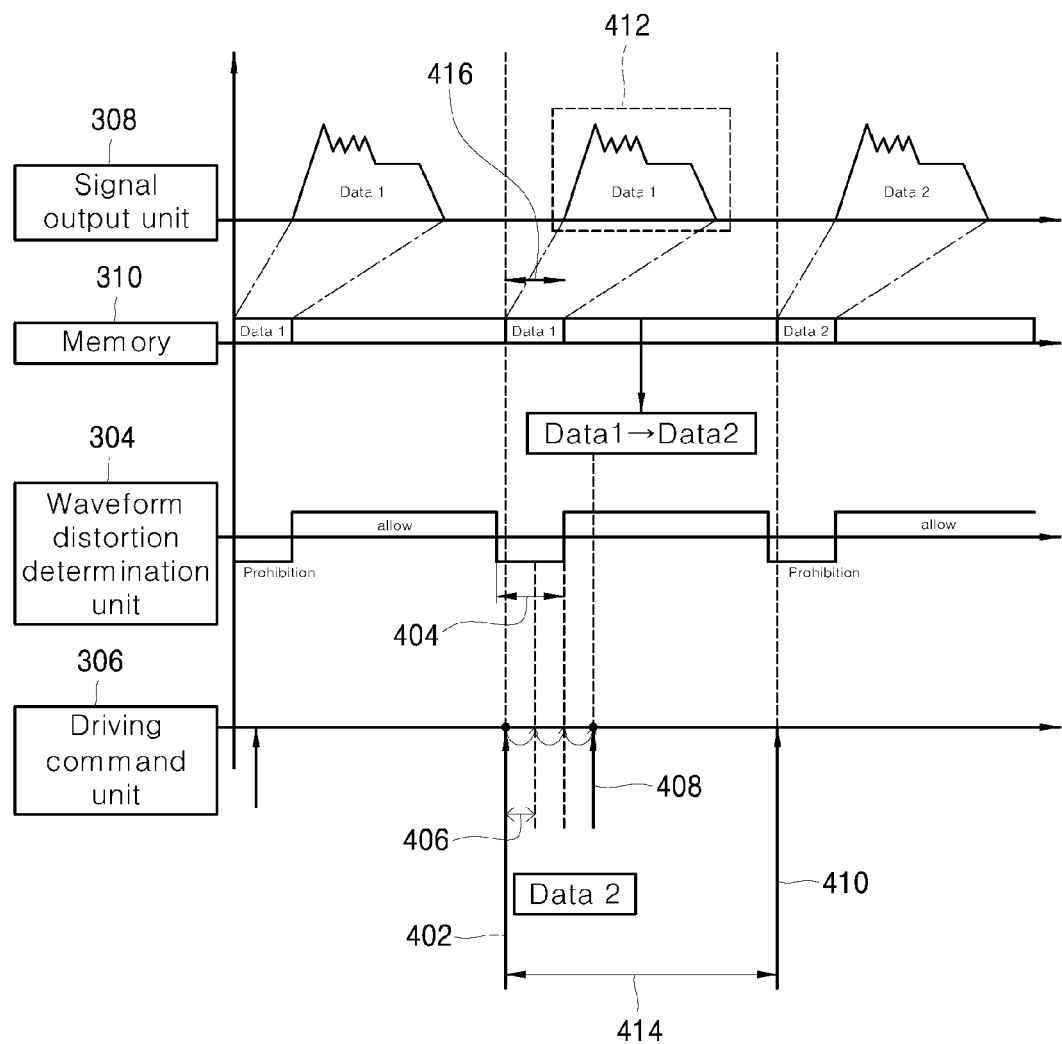
FIG. 4 is a view for explaining a process of renewing a waveform signal according to an embodiment of the present invention.

FIG. 4 is a view for explaining a process of renewing a waveform signal according to an embodiment of the present invention. In the embodiment of the present invention, the signal output unit 308 reads the waveform data of the memory 310 and outputs a waveform signal.

First, the waveform generation unit 302 generates waveform data for driving the solenoid valve using the vehicle driving information and requests renewal of the waveform by outputting the waveform data.

The waveform distortion determination unit 304 compares the time point 406 when the renewal of the waveform is requested with the communication prohibition section 404 to determine a possibility of distortion of the waveform signal. Here, the communication prohibition section 404 is set to be longer than a time period 416 spent to read the waveform data from the memory 310 by the signal output unit 308. As illustrated in FIG. 4, because the time point 406 when the renewal of a waveform is requested pertains to the communication prohibition section 404, distortion of a waveform signal occurs and the waveform data Data1 of the memory are not renewed to new waveform data Data2.

Subsequently, the driving command unit 306 searches for a time point when the renewal of the waveform is allowed using a search signal having a predetermined communication period 406. Here, the period 406 of a search signal is set to be shorter than the period 414 of a waveform renewal request. The driving command unit 306 records the waveform data Data2 generated by the waveform data generation unit in the memory 310 to renew the waveform data Data2 at a time point 408 when the renewal of the waveform is allowed.

Figure 2:
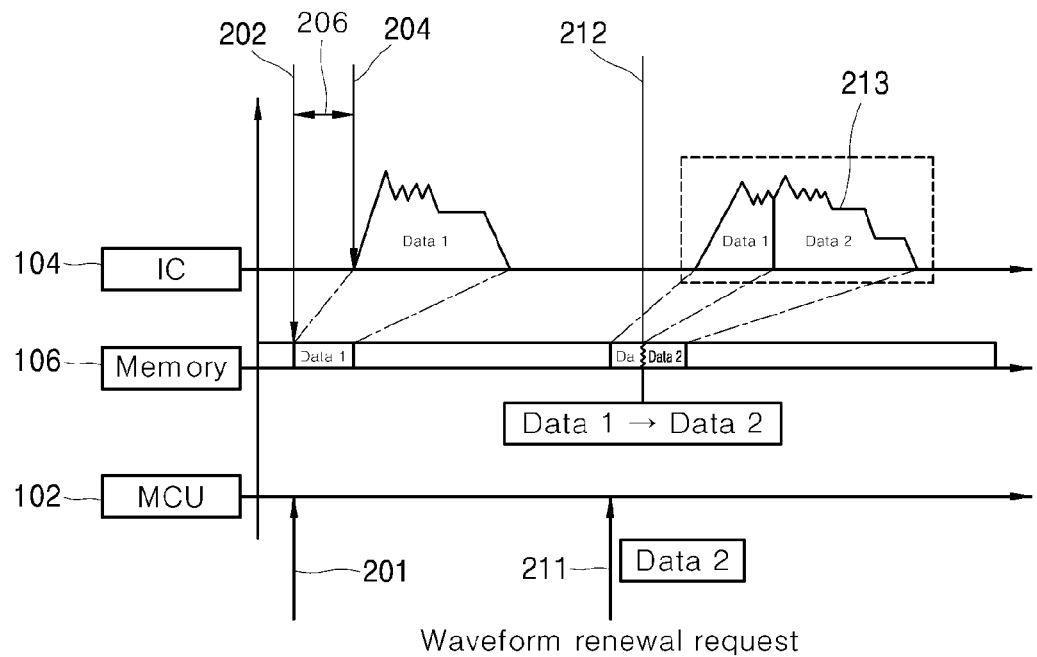
FIG. 2 is a view for explaining a distortion phenomenon of a waveform signal according a waveform signal output device of the related art.

Accordingly, when the waveform signal 412 output from the signal output unit of FIG. 4 is compared with the waveform signal 213 of FIG. 2, distortion of a waveform due to replacement of waveform data does not occur in the waveform signal 412 of FIG. 4.

Figure 5:
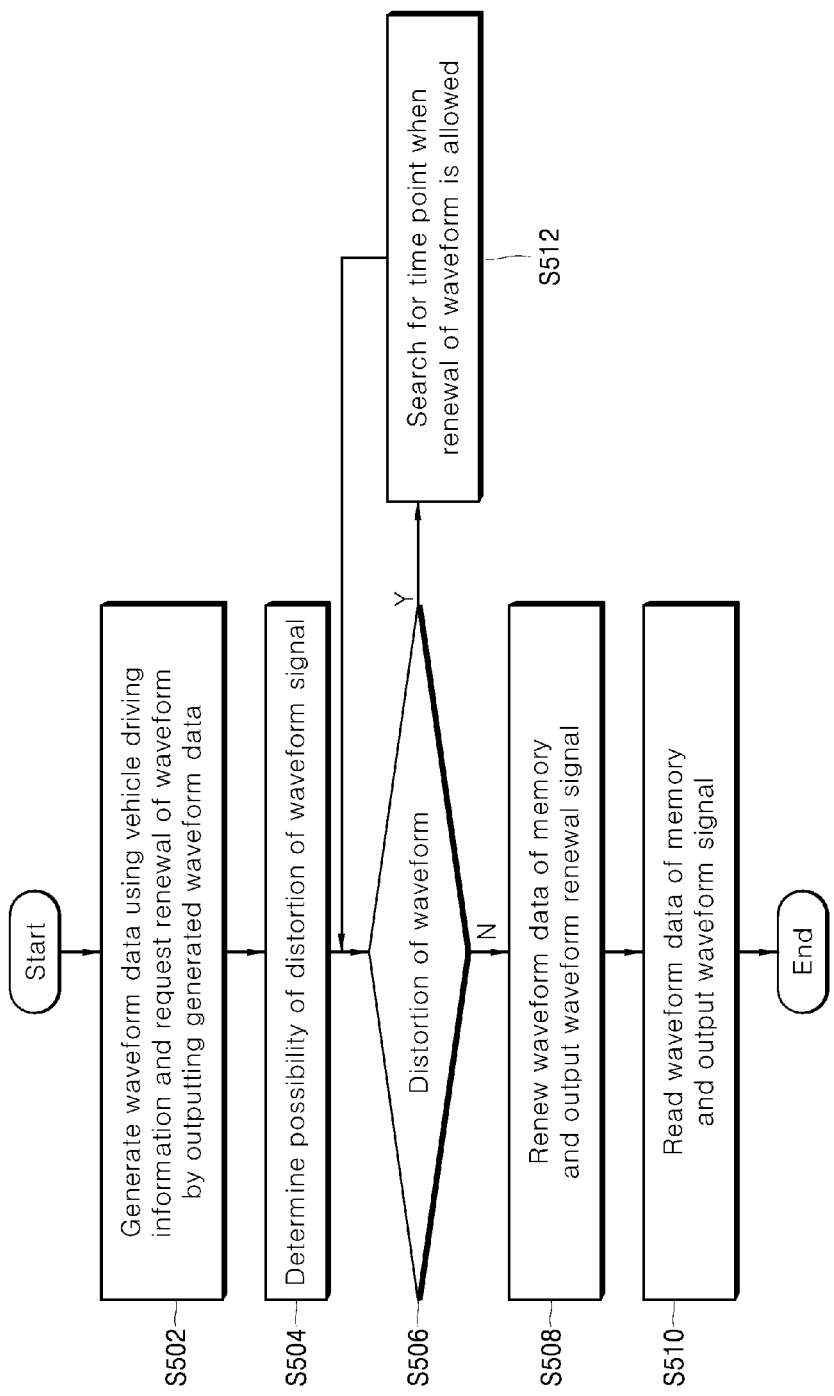
FIG. 5 is a flowchart of a waveform signal output method for driving a solenoid valve according to an embodiment of the present invention.

FIG. 5 is a flowchart of a waveform signal output method for driving a solenoid valve according to an embodiment of the present invention.

Referring to FIG. 5, the waveform g generation unit 302 generates waveform data for driving the solenoid valve using the vehicle driving information and requests renewal of the waveform by outputting the generated waveform data (S502). As described above, the vehicle driving information may include information for controlling a crank shaft and a cam shaft of the vehicle, gear information, and fuel rail hydraulic information.

Subsequently, the waveform distortion determination unit 304 determines a possibility of distortion of a waveform signal (S504). As described above, step S502 may include a step of comparing g a time point when renewal of a waveform is requested with a preset communication prohibition section and determining a possibility of distortion of a waveform signal.

If there is no possibility of distortion of a waveform in the determination result (S506), the driving command unit 306 renews the waveform data of the memory and outputs a waveform renewal signal (S508).

Finally, the signal output unit 308 reads waveform data recorded in the memory 310 and outputs a waveform signal for driving the solenoid valve according to the waveform renewal signal (S510).

Meanwhile, when distortion of a waveform occurs in the determination result (S506), the waveform data are not renewed, and a time point when the renewal of the waveform is allowed is searched for using a search signal having a predetermined communication period (S512). A step S506 of determining distortion of a waveform is performed after step S512, and steps 508 to 510 are performed when there is no possibility of distortion of a waveform.

As mentioned above, the present invention can determine whether a waveform signal is distorted and changes waveform data only if the waveform signal is not distorted when the waveform signal is renewed to drive a solenoid valve, thereby preventing a distortion phenomenon of the waveform signal while satisfying an existing renewal period of the waveform signal.

The present invention may be variously replaced, modified, and changed by those skilled in the art to which the present invention pertains without departing from the technical spirit of the present invention, and accordingly it is noted that the present invention is not limited to the above-described embodiments and the accompanying drawings.

What is claimed is:

1. A waveform signal output device for driving a solenoid valve, the waveform signal output device comprising:
   a signal output unit that reads waveform data recorded in a memory and outputs a waveform signal for driving the solenoid valve according to a waveform renewal signal;
   a waveform generation unit that generates waveform data for driving the solenoid valve using vehicle driving information and requests renewal of a waveform by outputting the waveform data;
   a waveform distortion determination unit that compares a time point when the renewal of a waveform is requested and a preset communication prohibition section and determines a possibility of distortion of the waveform signal; and
   a driving command unit that renews waveform data of the memory using the waveform data generated by the waveform generation unit and outputs a waveform renewal signal if it is determined that there is no possibility of distortion.

2. The waveform signal output device of claim 1, wherein the driving command unit searches for a time point when renewal of a waveform is allowed using a search signal having a predetermined communication period without renewing the waveform data if it is determined that distortion of a waveform occurs.

3. The waveform signal output device of claim 2, wherein the driving command unit renews the waveform data of the memory using the waveform data generated from the waveform generation unit at a time point when the renewal of the waveform is allowed.

4. The waveform signal output device of claim 2, wherein the period of the search signal is set to be shorter than a period in which the renewal of the waveform is requested.

5. The waveform signal output device of claim 1, wherein the communication prohibition section is set to be longer than a time period in which the signal output unit reads the waveform data from the memory.

6. A waveform signal output method for driving a solenoid valve, the waveform signal output method comprising:
   generating waveform data for driving the solenoid valve using vehicle driving information and requesting renewal of a waveform by outputting the waveform data by a waveform generation unit;

comparing a time point when the renewal of a waveform is requested and a preset communication prohibition section and determining a possibility of distortion of the waveform signal by a waveform distortion determination unit;

renewing waveform data of a memory using the waveform data generated by the waveform generation unit and outputting a waveform renewal signal if it is determined that there is no possibility of distortion by a driving command unit; and reading waveform data recorded in the memory and outputting a waveform signal for driving the solenoid valve according to a waveform renewal signal by a signal output unit.

7. The waveform signal output method of claim 6, wherein renewing waveform data of the memory using the waveform data generated by the waveform generation unit and outputting a waveform renewal signal by the driving command unit comprises searching for a time point when renewal of a waveform is allowed using a search signal having a predetermined communication period without renewing the waveform data if it is determined that distortion of a waveform occurs.

8. The waveform signal output method of claim 7, further comprising:

after searching a time point when the renewal of the waveform is allowed, renewing the waveform data of the memory using the waveform data generated from the waveform generation unit at a time point when the renewal of the waveform is allowed.

9. The waveform signal output method of claim 7, wherein the period of the search signal is set to be shorter than a period in which the renewal of the waveform is requested.

10. The waveform signal output method of claim 6, wherein the communication prohibition section is set to be longer than a time period in which the signal output unit reads the waveform data from the memory.

\* \* \* \* \*